United States Patent
Ota et al.

(10) Patent No.: US 12,405,817 B2
(45) Date of Patent: Sep. 2, 2025

(54) CONTAINER RESOURCE DESIGNING DEVICE, CONTAINER RESOURCE DESIGNING METHOD, AND PROGRAM

(71) Applicant: Nippon Telegraph and Telephone Corporation, Tokyo (JP)

(72) Inventors: Masazumi Ota, Musashino (JP); Makoto Hamada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 479 days.

(21) Appl. No.: 17/926,936

(22) PCT Filed: May 21, 2020

(86) PCT No.: PCT/JP2020/020042
§ 371 (c)(1),
(2) Date: Nov. 21, 2022

(87) PCT Pub. No.: WO2021/234885
PCT Pub. Date: Nov. 25, 2021

(65) Prior Publication Data
US 2023/0195497 A1   Jun. 22, 2023

(51) Int. Cl.
*G06F 3/00* (2006.01)
*G06F 9/455* (2018.01)

(52) U.S. Cl.
CPC .............. *G06F 9/45558* (2013.01); *G06F 2009/45575* (2013.01); *G06F 2009/45591* (2013.01)

(58) Field of Classification Search
CPC ........................................................ G06F 9/58
See application file for complete search history.

(56) References Cited

U.S. PATENT DOCUMENTS 10,191,778 B1 *  1/2019  Yang .................. G06F 11/301
10,601,740 B1 *  3/2020  Harding .............. H04L 51/04
(Continued)

FOREIGN PATENT DOCUMENTS

CN   109117265 A   *   1/2019   ........... G06F 9/5027
CN   110300130 A   *  10/2019   ........... G06F 9/4881
(Continued)

OTHER PUBLICATIONS

Jeremy Casas, Mist: PVM with Transparent Migration and Checkpointing. (Year: 1995).*

(Continued)

*Primary Examiner* — Lechi Truong
(74) *Attorney, Agent, or Firm* — Fish & Richardson P.C.

(57) ABSTRACT

A master node, which is a container resource design device, includes: a container setting reception unit configured to acquire definition information including a replica set count indicating a number of redundancies of a pod, an affinity rule indicating a condition for starting up containers, and a failure tolerance count; a resource calculation unit configured to calculate a required worker node count while satisfying the replica set count and satisfying the condition defined in the affinity rule, even if a failure of the failure tolerance count or less has occurred in a worker node, and transmit resource dispensation instruction information to a resource management mechanism; and a container setting unit configured to determine placement of the pods on dispensed worker nodes and transmit container setting information.

4 Claims, 6 Drawing Sheets

(56) References Cited

U.S. PATENT DOCUMENTS

| | | | |
|---|---|---|---|
| 11,005,721 B1* | 5/2021 | Patki | H04L 43/045 |
| 11,134,098 B1* | 9/2021 | Lieberman | H04L 63/1425 |
| 11,171,950 B1* | 11/2021 | Zhuravlev | H04L 67/141 |
| 11,422,844 B1* | 8/2022 | Filiz | G06F 9/45558 |
| 11,853,807 B1* | 12/2023 | Coult | G06F 9/5077 |
| 2007/0180314 A1 | 8/2007 | Kawashima et al. | |
| 2016/0205518 A1* | 7/2016 | Patel | H04L 41/0895 455/518 |
| 2019/0235775 A1* | 8/2019 | Zwiegincew | G06F 3/0604 |
| 2019/0379590 A1* | 12/2019 | Rimar | G06F 16/9024 |
| 2020/0133731 A1* | 4/2020 | Barbara | G06F 9/5016 |
| 2020/0136987 A1* | 4/2020 | Nakfour | H04L 41/16 |
| 2020/0250006 A1* | 8/2020 | Parekh | H04L 67/1008 |
| 2020/0403872 A1* | 12/2020 | Shivashankara | H04L 67/1095 |
| 2021/0117868 A1* | 4/2021 | Sriharsha | G06N 20/20 |
| 2021/0303290 A1* | 9/2021 | Schmit | G06F 9/45558 |
| 2021/0326763 A1* | 10/2021 | Bernat | H04L 9/3236 |
| 2021/0349767 A1* | 11/2021 | Asayag | G06F 9/4856 |
| 2022/0147391 A1* | 5/2022 | Balcha | G06F 11/328 |
| 2022/0156102 A1* | 5/2022 | Bandarupalli | G06F 9/5077 |
| 2022/0156129 A1* | 5/2022 | Li | G06F 9/542 |
| 2022/0253335 A1* | 8/2022 | Bequet | G06N 3/084 |
| 2022/0329499 A1* | 10/2022 | Smith | H04L 41/16 |
| 2023/0094937 A1* | 3/2023 | Arndt | H04L 41/042 718/1 |
| 2023/0138344 A1* | 5/2023 | Bequet | G06F 9/4881 718/104 |

FOREIGN PATENT DOCUMENTS

| | | | | |
|---|---|---|---|---|
| CN | 111694633 A | * | 9/2020 | G06F 9/45558 |
| JP | 2007207219 | | 8/2007 | |

OTHER PUBLICATIONS

ID Wilson, Container stowage planning: a methodology for generating computerised solutions. (Year: 2000).*

[No Author Listed] [online], "Start Nginx with Kubernetes Manifest file," Leaf of Thought, Apr. 16, 2019, retrieved from URL <https://noumenon-th.net/programming/2019/04/16/manifest01>, 9 pages (with English Translation).

Nishijima, "Running Kubernetes manifests on Magnum," Think IT, Feb. 12, 2016, retrieved from URL <https://thinkit.co.jp/article/9378>, 33 pages (with English Translation).

* cited by examiner

CONTAINER RESOURCE DESIGNING DEVICE, CONTAINER RESOURCE DESIGNING METHOD, AND PROGRAM

CROSS-REFERENCE TO RELATED APPLICATIONS

This application is a National Stage application under 35 U.S.C. § 371 of International Application No. PCT/JP2020/020042, having an International Filing Date of May 21, 2020, the disclosure of which is considered part of the disclosure of this application, and is incorporated by reference in its entirety into this application.

TECHNICAL FIELD

The present invention relates to a container resource design device, a container resource design method, and a program for designing a resource of a container system in virtualization technology.

BACKGROUND ART

In a container system to which virtualization technology is applied, a container orchestration engine (container control mechanism) has a function of performing orchestration of containers across multiple hosts, and a cluster is constituted by multiple worker nodes that provide execution hosts for the containers and a master node that manages the worker nodes. In this container control mechanism, the replica set count can be specified in order to maintain a declarative state in which self-healing is possible. Here, a "replica set" is a function in which the container control mechanism creates replicas of a plurality of pods. A pod is a set of one or more containers. For example, if the number of pods decreases due to a node failure or the like, the container control mechanism automatically starts up the pod using another node and thus maintains the replica count. Also, in the container control mechanism, a condition of a worker node on which placement is possible can be specified as a placement condition required for a container using an affinity rule (e.g., see NPL 1).

CITATION LIST

Non Patent Literature

[NPL 1] Nao Nishijima, "Executing Kubernetes Manifest in Magnum", [online], impress, Feb. 12, 2016, [searched for on May 12, 2020], Internet <URL: https://thinkit.co.jp/article/9378>

SUMMARY OF THE INVENTION

Technical Problem

However, regarding the relationship between the replica set count and the affinity rule for the worker node on which placement is to be performed, conventionally, when designing a resource, a system administrator (designer) needed to manually prepare or set a resource to be a worker node after consideration.

Figure 6:
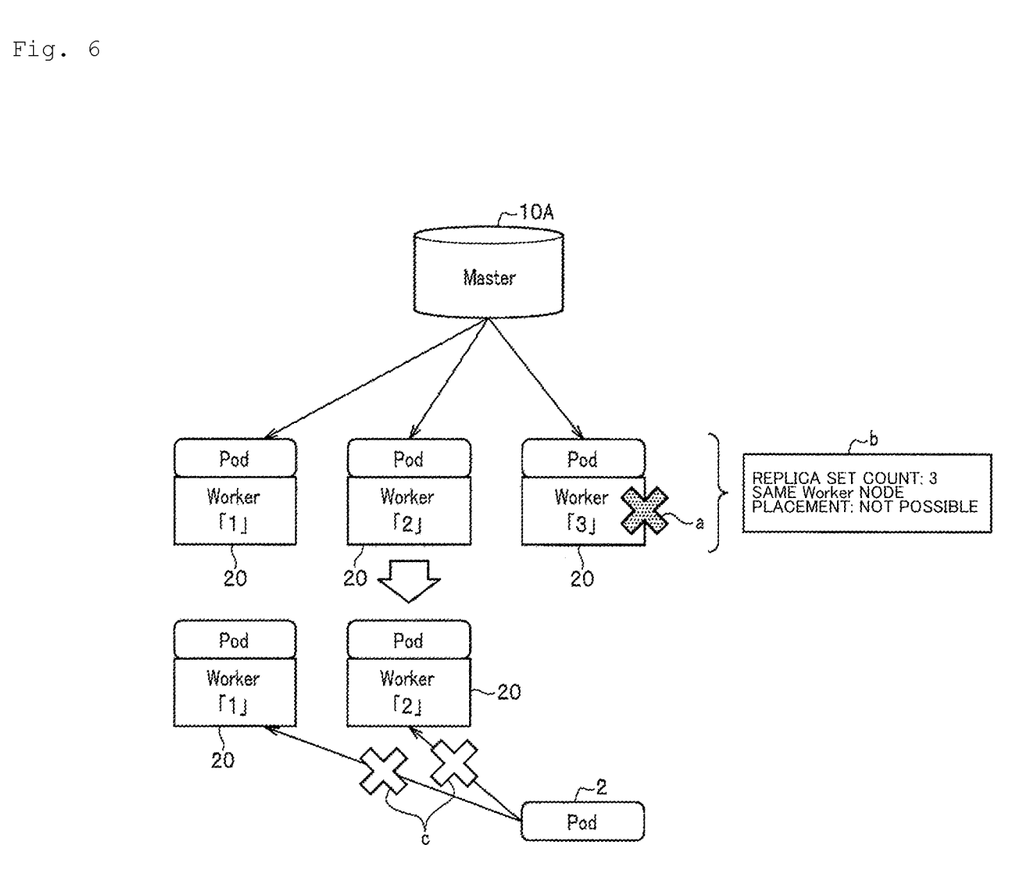
FIG. 6 is a diagram for describing a problem in a conventional container control mechanism.

For example, as shown in FIG. 6, a case (reference sign a in FIG. 6) is envisioned in which, when pods with a replica set count of "3" (here, 1 pod is 1 container) are placed on three worker nodes 20 (worker nodes are denoted as "Worker" in the drawings) by a master node 10A (the master node is denoted as "Master" in the drawings), one of the three worker nodes fails. At this time, when the replica set count is "3" and the affinity rule "replicas of the same container (pod) are not placed on the same worker node" (same worker node placement: not possible) is set (reference sign b in FIG. 6), due to the affinity rule, the same container (Pod) cannot be placed on the worker nodes "1" and "2" that are not the failed worker node "3" (reference sign c in FIG. 6). Accordingly, since the replica set count "3" cannot be maintained, it is assumed that the declarative state cannot be maintained.

In this manner, if the replica set count of the containers and the affinity rule indicating the condition for starting up the containers conflict with each other, the containers cannot be started up and the service is stopped in some cases.

The present invention has been made in view of this, and it is an object of the present invention to eliminate the need for manual resource design in a container system and improve service continuity in the event of a failure.

Means for Solving the Problem

A container resource design device according to the present invention is a container resource design device for performing resource design for a virtualized container system, in which the container system is constituted by a plurality of worker nodes configured to provide a service due to containers being placed thereon, and the container resource design device for performing generation and operation of the worker nodes, and the container resource design device includes: a container setting reception unit configured to acquire definition information including a replica set count indicating a number of redundancies of a pod in units of pods, a pod being a set of one or more of the containers, an affinity rule indicating a condition for starting up the containers, and a failure tolerance count indicating a number of the worker nodes for which occurrence of a failure is allowed in order to maintain a state in which self-healing is possible; a resource calculation unit configured to extract the replica set count, the affinity rule, and the failure tolerance count from the definition information, calculate a required worker node count indicating a minimum required number of the worker nodes while satisfying the replica set count and satisfying the condition defined by the affinity rule, even if a failure of the failure tolerance count or less has occurred in the worker nodes, and dispense the worker nodes of the required worker node count as resources by transmitting resource dispensation instruction information, which is information instructing dispensation of resources, to a resource management mechanism, the resource dispensation instruction information including the calculated required worker node count; and a container setting unit configured to determine placement of the pods of the number indicated by the replica set count on the dispensed worker nodes, and transmit container setting information instructing setting of containers constituting the pods to the worker nodes for which the placement of the pods was determined.

Effects of the Invention

According to the present invention, in a container system, it is possible to eliminate the need for manual resource design and improve service continuity in the event of a failure.

DESCRIPTION OF EMBODIMENTS

Next, an embodiment of the present invention (hereinafter, referred to as "the present embodiment") will be described.

Figure 1:
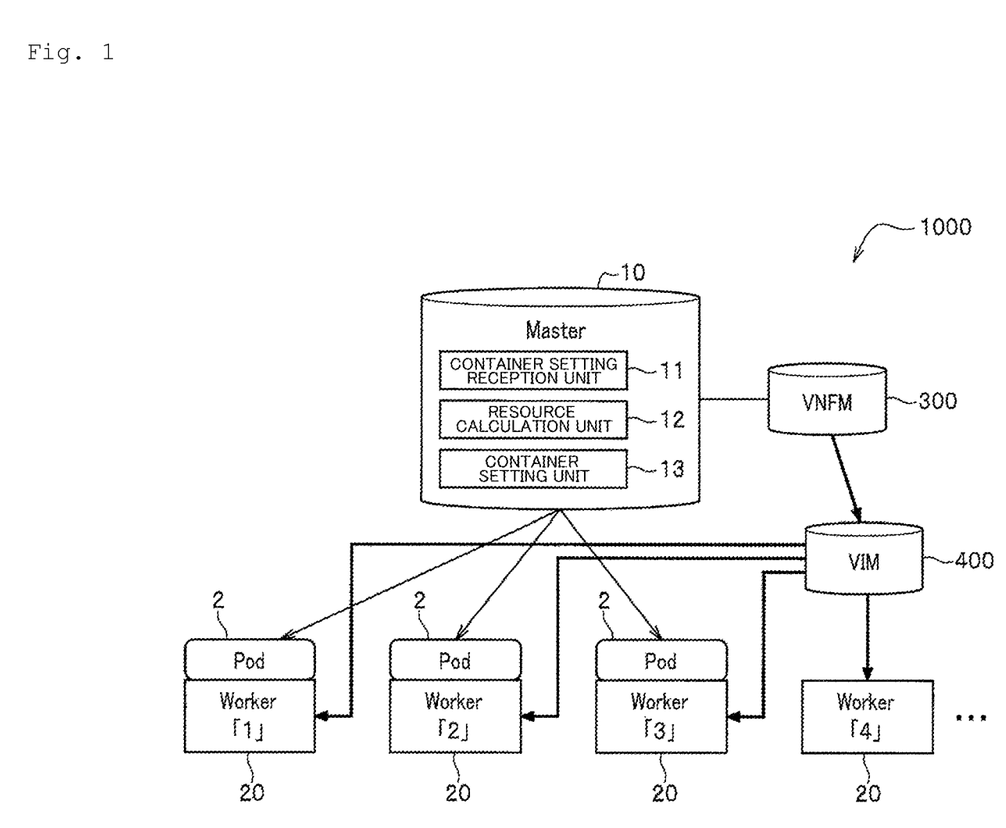
FIG. 1 is a diagram showing an overall configuration of a container resource design system including a container resource design device (master node) according to the present embodiment.

FIG. 1 is a diagram showing an overall configuration of a container resource design system 1000 including a container resource design device (master node 10) according to the present embodiment.

The container resource design system 1000 is constituted by including the master node 10 (Master) and a plurality of worker nodes 20 (Workers), which are set by a container orchestration engine (container control mechanism), a VNFM (VNF (Virtual Network Function) Manager) 300 that manages a VNF, which is a virtualized network function, and a VIM (Virtualized Infrastructure Manager) 400 that manages physical resources and virtual resources set on physical resources.

Note that the container orchestration engine is, for example, "Kubernetes" (registered trademark) described in NPL 1, but there is no limitation thereto. Also, the master node 10 corresponds to the container resource design device according to the claims. The VNFM 300 and the VIM 400 constitute the resource management mechanism described in the claims.

Here, the master node 10 manages the worker nodes 20 and pods 2 placed on the worker nodes 20.

The master node 10 (container resource design device) according to the present embodiment acquires definition information (manifest files) related to setting (deployment) of containers from a management device of a container system or the like. In this definition information (manifest files), a "failure tolerance count" (details will be described later), which is information unique to this embodiment, is described in addition to a replica set count and an affinity rule indicating a condition for starting up the containers. Also, based on the acquired definition information, the master node 10 calculates the number of worker nodes 20 on which pods that are the units for container creation are placed, based on a predetermined logic using the replica set count, the affinity rule, and the failure tolerance count. The master node 10 sets (dispenses as resources) the calculated number of worker nodes 20 via the VNFM 300 and the VIM 400 (resource management mechanism). Next, when pods are allocated to the worker nodes 20 by the master node 10, the containers are set in the worker nodes 20. Then, task processing for service provision is actually performed by the containers.

Here, the VNFM 300 has a function of performing lifecycle (generation, deletion, scaling) management of a VNF in a standard definition of ETSI (European Telecommunications Standards Institute) NFV (Network Functions Virtualization) ("ETSI GS NFV-SOL 002 V2.6.1," ETSI, 2019-04, Internet <URL: https://www.etsi.org/deliver/etsi gs/NFV-SOL/001_099/002/02.06.01_60/gs NFV-SOL002v-020601p.pdf>).

Also, the VIM 400 has a function of managing the operation of physical resources and virtual resources according to the ETSI VNF standard definition, and dispenses worker nodes 20 constituted by VMs (Virtual Machines).

The master node 10 (container resource management device) dispenses the worker nodes 20 using virtual resources via the VNFM 300 and the VIM 400.

<Master Node (Container Resource Management Device)>

Hereinafter, the master node 10 (container resource management device) according to the present embodiment will be described in detail with reference to FIG. 1.

The master node 10 performs processing for managing the worker nodes 20 and the pods 2 placed on the worker nodes 20, which is a conventional function. Also, as processing unique to the present embodiment, the master node 10 calculates the number of worker nodes 20 on which the pods 2, which are units for creating containers, are placed using a predetermined logic based on the replica set count, the affinity rule indicating the condition for starting up the containers, and the failure tolerance count. The master node 10 is characterized by dispensing the worker nodes 20 and controlling container placement.

Note that the master node 10 and the worker nodes 20 constituting the cluster set by the container orchestration engine (container control mechanism) may be physical devices or VMs, but are described below as VMs unless otherwise specified. If the master node 10 and the worker node 20 are physical devices, the nodes (physical devices) are dispensed (set) by transmitting request information regarding the setting (dispensation) of the worker nodes 20 to the management device of the container system or the like.

The master node 10 includes a control unit, an input/output unit, and a storage unit (none of which are shown in the drawings).

The input/output unit performs input and output of information to and from each worker node 20, the VNFM 300, other external devices, and the like. The input/output unit includes a communication interface for transmitting and receiving information via a communication line.

The storage unit stores configuration information and the like between the worker nodes 20, the pods, and the nodes, which is information relating to the cluster.

As shown in FIG. 1, the control unit is constituted by including a container setting reception unit 11, a resource calculation unit 12, and a container setting unit 13.

The container setting reception unit 11 acquires definition information (manifest files) related to the container from the management device of the container system or the like.

The definition information acquired by the container setting reception unit 11 is characterized by including the failure tolerance count in addition to the replica set count and the affinity rule indicating the condition for starting up the containers, which have conventionally been described.

Note that, as will be described later, the container setting reception unit 11 may also receive definition information relating to a plurality of replica sets set at the same time.

This failure tolerance count sets the number of M (reserve system) worker nodes 20 with respect to the number of N (active system) worker nodes 20 corresponding to the replica set count in an N+M redundancy configuration. The failure tolerance count indicates the number of worker nodes 20 that are allowed in order to maintain a declarative state (a state in which self-healing is possible) while satisfying the replica set count and the affinity rule, that is, the number of worker nodes 20 to be dispensed in advance in order to maintain the declarative state even if a failure occurs in the worker nodes 20.

The "failure" assumed by the failure tolerance count corresponds to not only a failure that occurs in a worker node 20, but also a failure in the case where the traffic amount, CPU usage rate, or the like of each worker node 20 exceeds a predetermined threshold value. The master node 10 dispenses the (reserve system) worker nodes 20 in advance with consideration given to the failure tolerance count. Also, the master node 10 satisfies the affinity rule by placing pods on the (reserve system) worker nodes 20 that have been dispensed in advance such that the traffic amount, CPU usage rate, and the like of the worker nodes 20 do not exceed predetermined threshold values.

The resource calculation unit 12 extracts information on the replica set count, the affinity rule indicating the condition for starting up the containers, and the failure tolerance count from the acquired definition information (manifest file). Then, the resource calculation unit 12 calculates a required worker node count based on logic (predetermined logic) stating that the minimum number of worker nodes 20 (VM resources) needed for maintaining the declarative state (hereinafter referred to as "required worker node count") is calculated using the replica set count, the affinity rule, and the failure tolerance count.

Also, if the resource calculation unit 12 receives definition information (manifest files) of a plurality of replica sets (a plurality of pods that are different from each other) requesting startup of containers at the same time, the resource calculation unit 12 calculates the minimum required number of worker nodes 20 (required worker node count) overall in order to satisfy all of the plurality of pieces of definition information and maintain the declarative state.

By doing so, when the definition information of a plurality of replica sets requesting startup of the containers is received, the master node 10 can calculate the required worker node count that is the minimum required overall to maintain the declarative state. Accordingly, it is possible to eliminate the need for manual resource design. Also, resources can be operated more efficiently.

Furthermore, if the resource calculation unit 12 acquires definition information in which an affinity rule with a label identifying the resource type is described, the resource calculation unit 12 determines the label type and calculates the "required label node count". If the label type is, for example, "GPU (Graphics Processing Unit)", the resource calculation unit 12 calculates "the required GPU label node count". As the label type, in addition to "GPU", for example, a storage or a network device may be specified and distinguished as a label.

By doing so, the master node 10 can specify the resource type with consideration given to the label type and calculate resources of the required label node count (e.g., "the required GPU label node count"). Accordingly, it is possible to eliminate the need for manual resource design even when definition information in which a labeled affinity rule is described is acquired.

If the required worker node count and the required label node count have been calculated, the resource calculation unit 12 transmits the worker nodes 20 of the required label node count to the VNFM 300 as instruction information to be dispensed as a resource (hereinafter referred to as "resource dispensation instruction information"). As a result, the VIM 400 acquires the instruction information from the VNFM 300, and the worker nodes 20 constituted by VMs are dispensed. Note that the worker nodes 20 dispensed by the VIM 400 are registered in the master node 10.

The container setting unit 13 determines the placement of the pods 2, the number of which is indicated by the replica set count, in the dispensed worker nodes 20, and transmits information (container setting information) instructing setting of the pods 2 to the worker nodes 20 for which the placement of the pods 2 has been determined. The worker nodes 20 receive this container setting information and create the pods.

Also, the container setting unit 13 monitors the worker nodes 20, and if a failure occurs in the worker nodes 20, the container setting unit 13 determines the placement destination of a new pod 2, as well as a worker node 20 that has been dispensed as a resource in advance so as to maintain the replica set count. Then, the container setting unit 13 transmits the container setting information to the worker node 20 determined as the placement destination of the new pod 2. By doing so, the master node 10 can maintain the declarative state in which self-healing is possible in the worker node 20.

Figure 2:
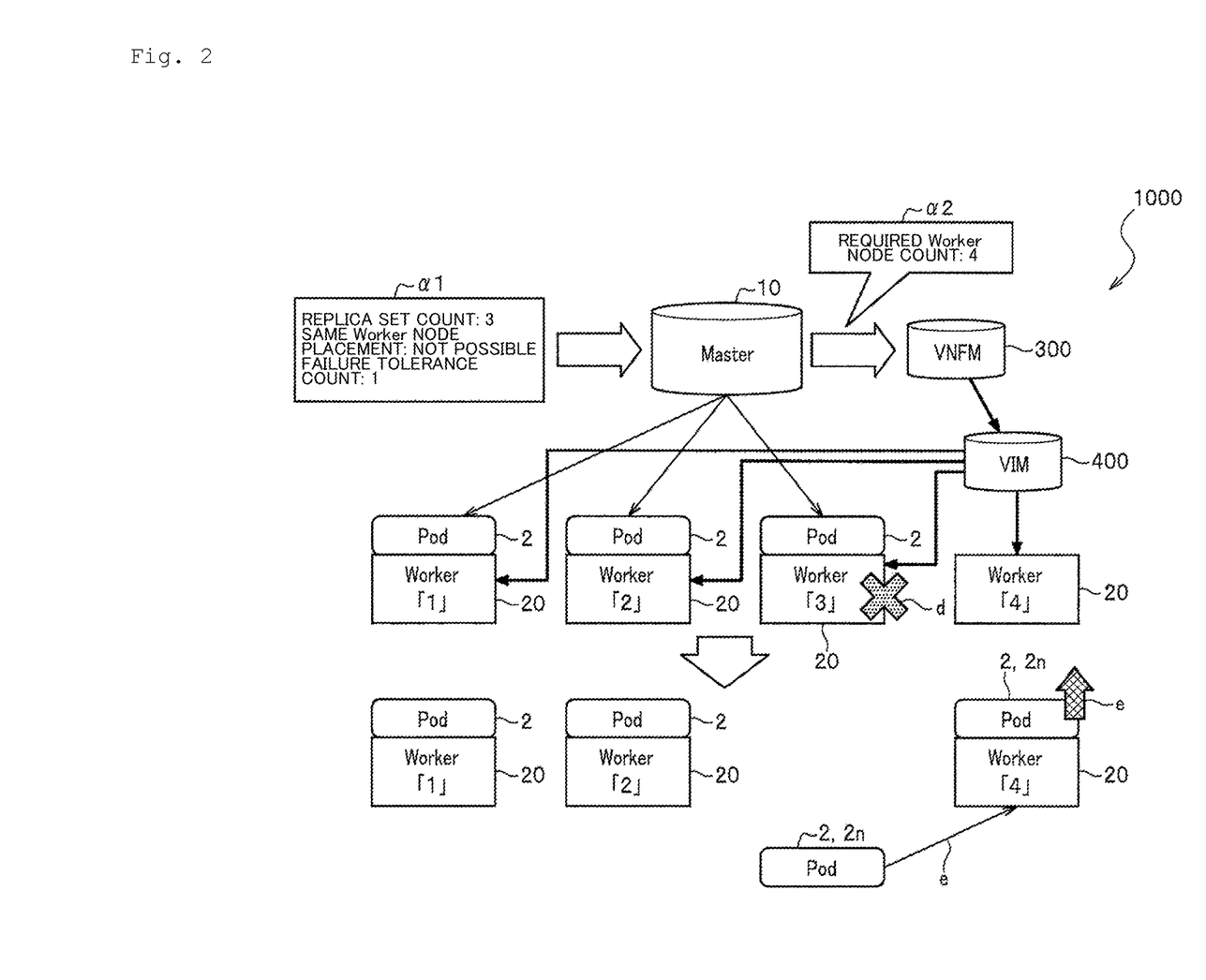
FIG. 2 is a diagram showing a first example of container resource design processing of the container resource design system including the container resource design device (master node) according to the present embodiment.
Figure 3:
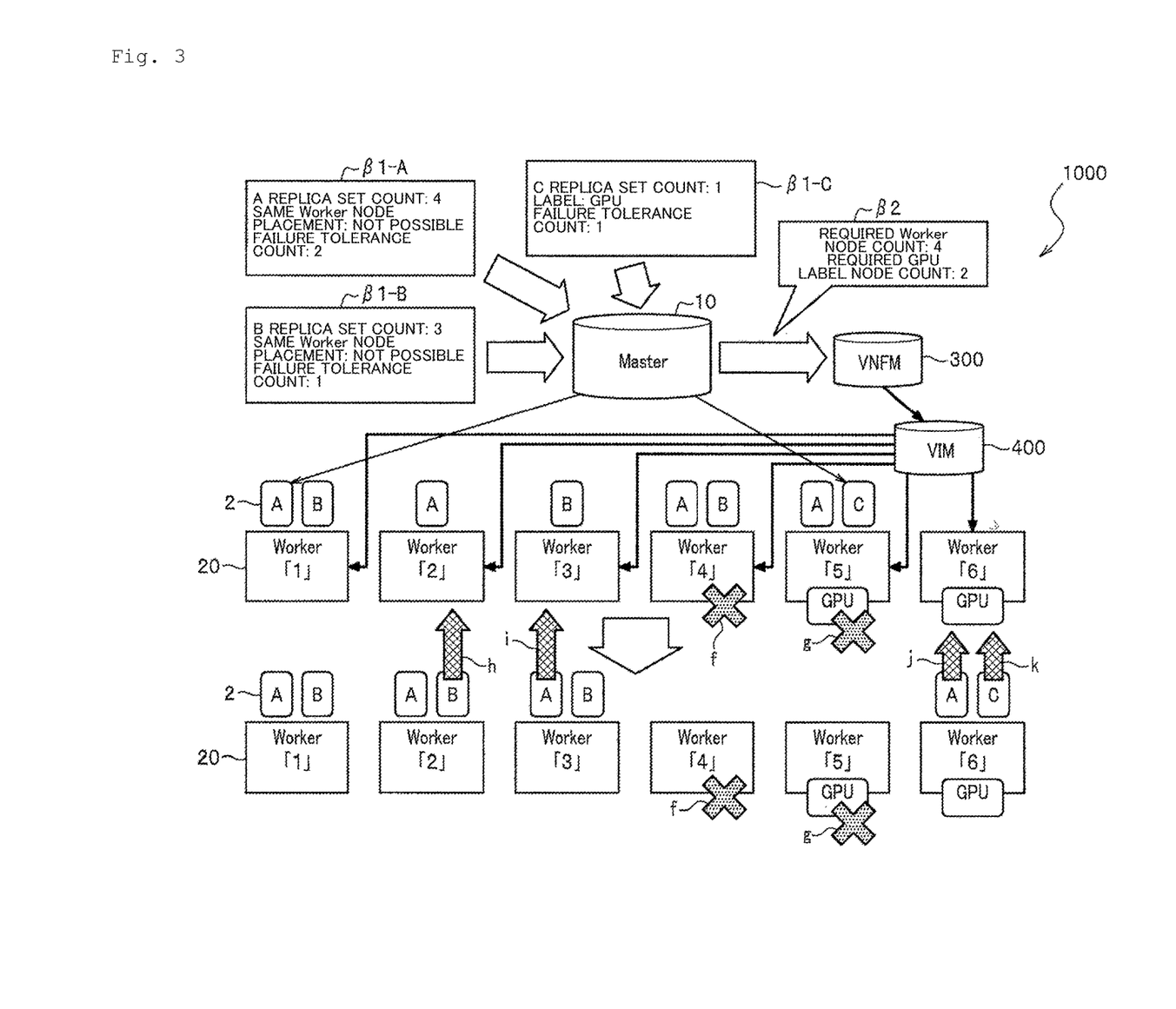
FIG. 3 is a diagram showing a second example of container resource design processing of the container resource design system including the container resource design device (master node) according to the present embodiment.

Next, examples of container resource design processing performed by the container resource design system 1000 including the master node 10 will be described. FIG. 2 shows the container resource design processing performed when the master node 10 acquires one piece of definition information (manifest file) related to the setting of the containers. FIG. 3 shows the container resource design processing performed when the master node 10 acquires a plurality of (three) pieces of definition information (manifest files) related to the setting of the containers.

FIRST EXAMPLE

FIG. 2 is a diagram showing a first example of the container resource design processing of the container resource design system 1000 including the container resource design device (master node 10) according to the present embodiment.

The master node 10 (container setting reception unit 11) acquires (one replica set of) definition information (manifest files) related to the setting of the containers from the management device of the container system or the like.

In this definition information, it is assumed that the replica set count is "3", "replicas of the same container (pod) are not placed on the same worker node" (same worker node placement: not possible) is described as the affinity rule indicating the condition for starting up the containers, and the failure tolerance count is "1" (reference sign al in FIG. 2).

The resource calculation unit 12 of the master node 10 extracts information on the replica set count, the affinity rule, and the failure tolerance count from the acquired definition information (manifest file). Then, the resource calculation unit 12 calculates the minimum number of worker nodes 20 (VM resources) (required worker node count) needed to maintain the declarative state.

Here, since replicas of the same container (pod) cannot be placed on the same worker node 20 due to the affinity rule and the failure tolerance count is "1", the resource calculation unit 12 calculates "4", which is obtained by adding "1" worker node 20 to the replica set count "3", as the required worker node count.

The resource calculation unit 12 of the master node 10 transmits the resource dispensation instruction information with the information of the required worker node count "4" to the VNFM 300 (reference sign α2 in FIG. 2). Then, the VNFM 300 transmits the resource dispensation instruction information to the VIM 400, whereby four worker nodes 20 (workers "1", "2", "3", and "4") are dispensed.

Next, the container setting unit 13 of the master node 10 determines the placement of the pods 2 of the number "3" indicated by the replica set count from among the dispensed worker nodes 20 (here, the workers "1", "2", and "3"), and transmits the container setting information instructing the setting of pods 2 to the worker nodes 20 for which the placement of the pods 2 has been determined. The worker nodes 20 (workers "1", "2", and "3") that received the container setting information set the pods 2.

Note that although the worker node "4" has been dispensed as a resource in advance, no pod 2 is set therein.

Here, for example, it is assumed that a failure has occurred in the worker node "3" (reference sign d in FIG. 2). In this case, since the replica set count "3" cannot be maintained as-is, the master node 10 (container setting unit 13) transmits the container setting information to the worker node "4" that has been dispensed in advance. As a result, the worker node "4" sets a pod 2 (2n) (reference sign e in FIG. 2). At this time, since the resources have been dispensed with consideration given to the affinity rule, it is possible to deal with a failure without interrupting the service. That is, service continuity can be improved.

SECOND EXAMPLE

FIG. 3 is a diagram showing a second embodiment of the container resource design processing of the container resource design system 1000 including the container resource design device (master node 10) according to the present embodiment.

The master node 10 (container setting reception unit 11) acquires a plurality of (three replica sets) pieces of definition information (manifest files) related to the setting of the containers from the management device of the container system or the like.

Here, it is assumed that three pieces of definition information requesting the setting of containers (pods) of an A replica set, a B replica set, and a C replica set have been acquired.

In the definition information of the A replica set, it is assumed that the replica set count is "4", "replicas of the same container (pod) are not placed in the same worker node" (same worker node placement: not possible) is described as the affinity rule indicating the condition for starting up the containers, and the failure tolerance count is "2" (reference sign β1-A in FIG. 2).

In the definition information of the B replica set, it is assumed that the replica set count is "3", "replicas of the same container (pod) are not placed in the same worker node" (same worker node placement: not possible) is described as the affinity rule indicating the condition for starting up the containers, and the failure tolerance count is "1" (reference sign β1-B in FIG. 2).

In the definition information of the C replica set, it is assumed that the replica set count is "1", a label "GPU" is described as the affinity rule indicating the condition for starting up the containers, and the failure tolerance count is "1" (reference sign β1-C in FIG. 2).

The resource calculation unit 12 of the master node 10 extracts information on the replica set count, the affinity rule, and the failure tolerance count from the three pieces of acquired definition information (manifest files). Then, the resource calculation unit 12 calculates the minimum number of worker nodes 20 (VM resources) (required worker node count) needed to maintain the declarative state. Also, since "GPU" is set as the label type in the C replica set, the resource calculation unit 12 calculates the minimum number of nodes required (required GPU label node count) to set a worker node 20 in a GPU serving as a resource.

The resource calculation unit 12 first compares the definition information of the A replica set and the B replica set. According to the affinity rule of the A replica set, replicas of the same container (pod) cannot be placed on the same worker node 20 and the failure tolerance count is "2", and therefore "6", which is obtained by adding "2" worker nodes 20 to the replica set count "4", is calculated as the required worker node count for the A replica set. On the other hand, according to the affinity rule of the B replica set, replicas of the same container (pod) cannot be placed on the same worker node 20, and the failure tolerance count is "1", and therefore "4", which is obtained by adding "1" worker node 20 to the replica set count "3", is calculated as the required worker node count for the B replica set. Accordingly, the minimum required node count (required worker node count) is "6" between the A replica set and the B replica set.

On the other hand, according to the definition information of the C replica set, the failure tolerance count is "1" in the placement of the worker nodes in the GPU, and therefore the number of worker nodes (required GPU label node count) to be placed in the GPU is "2".

Based on the above, the resource calculation unit 12 calculates the required worker node count "4" and the required GPU label node count "2" as the minimum required node count overall when setting three replica sets A, B, and C at the same time. Note that the required worker node count was "6" between the A replica set and the B replica set, but among them, the worker nodes 20 that use the GPU as a resource are made redundant with the worker nodes 20 assigned to the required GPU label node count "2" and setting is performed. Accordingly, the total number of worker nodes 20 to be dispensed as resources remains "6".

The resource calculation unit 12 of the master node 10 transmits the resource dispensation instruction information with the information of the required worker node count "4" and the required GPU label node count "2" to the VNFM 300 (reference sign (2 in FIG. 3). Then, the VNFM 300 transmits the resource dispensation instruction information to the VIM 400, whereby the four worker nodes 20 (workers "1", "2", "3", and "4") and the two worker nodes 20 that provide a GPU as a resource (workers "5" and "6") are dispensed.

Next, the container setting unit 13 of the master node 10 determines the placement of the pods 2 from among the dispensed worker nodes 20 according to the number indicated by the replica set count in the definition information of each replica set, and transmits the container setting information instructing the setting of the pods 2 to the worker nodes 20 for which the placement of the pods 2 was determined. Then, each worker node 20 that has received the container setting information sets the pod 2.

Here, the four pods of the A replica set are set in the worker nodes "1", "2", "4", and "5". The three pods in the B replica set are set in the worker nodes "1", "3", and "4". Also, the one pod of the C replica set is set in the worker node "5" that provides the GPU as a resource.

Note that although the worker node "6" has been dispensed as a resource in advance, no pod is set therein.

Here, for example, it is assumed that a failure has occurred in the worker nodes "4" and "5" (reference signs f and g in FIG. 3). In this case, in the current state, each replica set count cannot be maintained in the three replica sets A, B, and C. For this reason, the master node 10 (container setting unit 13) transmits the container setting information so as to place the pods of the A replica set on, for example, the worker nodes "3" and "6". The container setting information is transmitted so as to place the pod of the B replica set on, for example, the worker node "2". Also, the container setting information is transmitted such that the pod of the C replica set is placed on the worker node "6".

As a result, the worker node "2" sets the pod of the B replica set (reference sign h in FIG. 3). The worker node "3" sets the pod of the A replica set (reference sign i in FIG. 3). Also, the worker node "6" sets the pod of the A replica set and the pod of the C replica set (reference signs j and k in FIG. 3).

By doing so, it is possible to eliminate the need for manual resource design and improve service continuity in the event of a failure. Also, the setting of the worker nodes 20 can be suppressed to the minimum required number of nodes, and thus resources can be operated efficiently.

<Processing Flow>

Next, the flow of processing executed by the master node 10 will be described.

Figure 4:
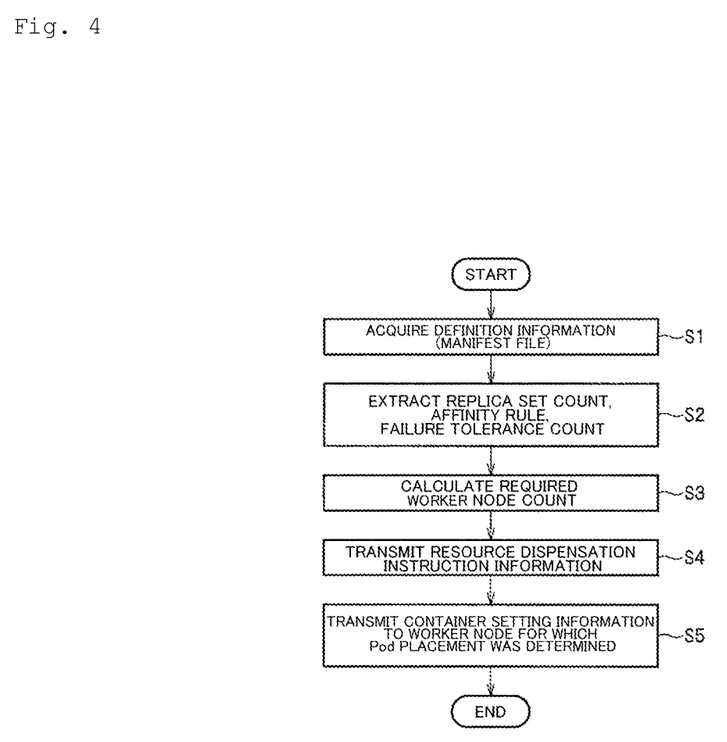
FIG. 4 is a flowchart showing a flow of processing executed by the container resource design device (master node) according to the present embodiment.

FIG. 4 is a flowchart showing a flow of processing executed by the container resource design device (master node 10) according to the present embodiment.

First, the container setting reception unit 11 of the master node 10 acquires definition information (manifest files) related to the containers from the management device of the container system or the like (step S1).

This definition information includes the replica set count, the affinity rule indicating the condition for starting up the container, and the failure tolerance count.

Also, the container setting reception unit 11 may receive definition information for a plurality of replica sets.

Next, the resource calculation unit 12 of the master node 10 extracts information on the replica set count, the affinity rule indicating the condition for starting up the container, and the failure tolerance count from the acquired definition information (manifest file) (step S2).

Next, the resource calculation unit 12 calculates the minimum number of worker nodes 20 (required worker node count) required to maintain the declarative state based on the replica set count, the affinity rule, and the failure tolerance count (step S3).

At this time, if the resource calculation unit 12 receives the definition information for a plurality of replica sets, the resource calculation unit 12 calculates the required worker node count such that the conditions of the replica set count, the affinity rule, and the failure tolerance count shown in each piece of definition information are satisfied and the worker node count is minimized overall. Also, if information on the label identifying the type of the resource is included in the affinity rule, consideration is given to the label type and the required label node count (e.g., "required GPU label node count" if the label is "GPU") is calculated as well such that the number of resources of the type indicated by the label is satisfied.

Next, the resource calculation unit 12 transmits, to the VNFM 300, the resource dispensation instruction information including the worker nodes 20 of the required worker node count, and of the required label node count (required GPU label node count) if the required label node count has been calculated (step S4). As a result, the VIM 400 acquires the instruction information from the VNFM 300 and the worker nodes 20 are dispensed. As a result, the worker nodes 20 dispensed by the VIM 400 are registered in the master node 10.

Then, the container setting unit 13 of the master node 10 determines the placement of the pods 2 of the number indicated by the replica set count in the dispensed worker nodes 20, and transmits container setting information for instructing setting of the pods 2 in the worker nodes 20 for which the placement of the pods 2 has been determined (step S5). The worker nodes 20 receive this container setting information and create the pods.

As a result, the master node 10 (container resource design device) can maintain the declarative state while satisfying the conditions of the replica set count and the affinity rule. Accordingly, it is possible to eliminate the need for manual resource design and improve service continuity in the event of a failure.

<Hardware Configuration>

Figure 5:
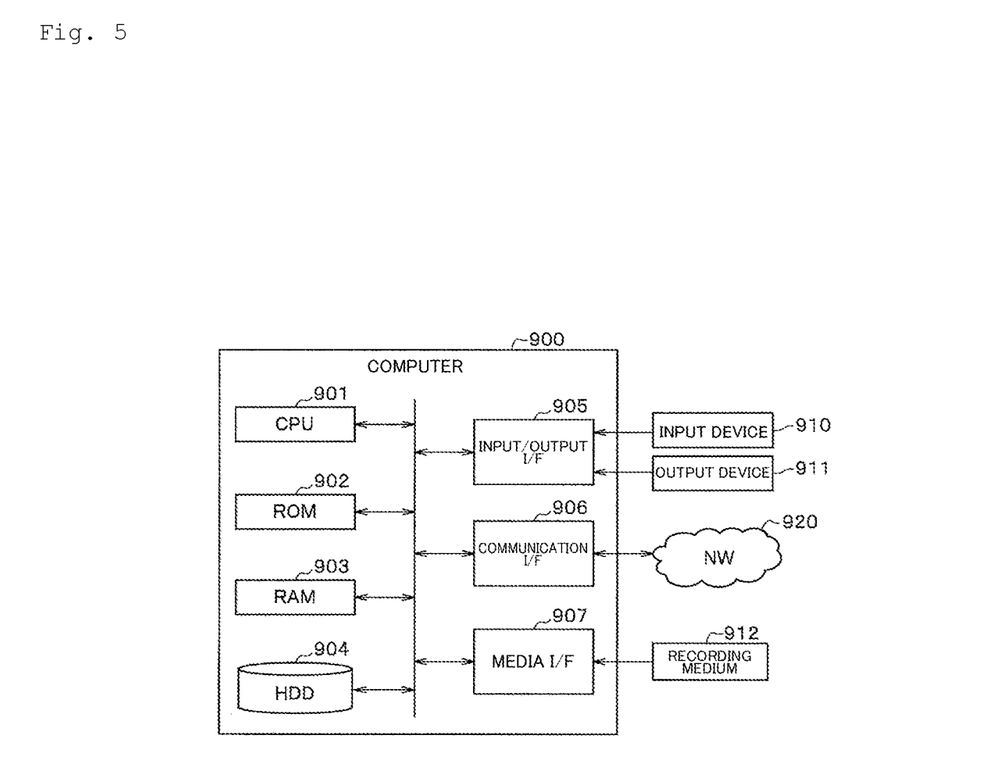
FIG. 5 is a hardware configuration diagram showing an example of a computer that realizes the function of the container resource design device (master node) according to the present embodiment.

The container resource design device (master node 10) according to the present embodiment is realized by, for example, a computer 900, which is a physical device having the configuration shown in FIG. 5.

FIG. 5 is a hardware configuration diagram showing an example of a computer 900 that realizes the function of the container resource design device (master node 10) according to the present embodiment. The computer 900 has a CPU 901, a ROM (Read Only Memory) 902, a RAM 903, an HDD (Hard Disk Drive) 904, an input/output I/F (interface) 905, a communication I/F 906, and a media I/F 907.

The CPU 901 operates based on the program stored in the ROM 902 or the HDD 904, and performs control according to a control unit (container setting reception unit 11, resource calculation unit 12, and container setting unit 13) of the container resource design device (master node 10) shown in FIG. 1. The ROM 902 stores a boot program to be executed by the CPU 901 when the computer 900 is started up, a program related to the hardware of the computer 900, and the like.

The CPU 901 controls an input device 910 such as a mouse and a keyboard and an output device 911 such as a display via the input/output I/F 905. The CPU 901 acquires data from the input device 910 via the input/output I/F 905 and outputs the generated data to the output device 911. Note that a GPU or the like may be used together with the CPU 901 as the processor.

The HDD 904 stores a program to be executed by the CPU 901 and data to be used by the program. The communication I/F 906 receives data from another device via a communication network (e.g., NW (Network) 920), outputs the data to the CPU 901, and transmits data generated by the CPU 901 to another device via the communication network.

The media I/F 907 reads the program or data stored in the recording medium 912 and outputs the program or data to the CPU 901 via the RAM 903. The CPU 901 loads the program related to the target processing from the recording medium 912 onto the RAM 903 via the media I/F 907, and executes the loaded program. The recording medium 912 is an optical recording medium such as a DVD (Digital Versatile Disc) or PD (Phase change rewritable Disk), a magneto-optical recording medium such as an MO (Magneto Optical disk), a magnetic recording medium, a conductor memory tape medium, a semiconductor memory, or the like.

For example, when the computer 900 functions as the container resource design device (master node 10) according to the present embodiment, the CPU 901 of the computer 900 realized the function of the container resource design device (master node 10) by executing the program loaded on the RAM 903. Also, the data in the RAM 903 is stored in the HDD 904. The CPU 901 reads the program related to the target processing from the recording medium 912 and executes it. In addition, the CPU 901 may read a program related to the target processing from another device via the communication network (NW 920).

<Effects>

Hereinafter, the effects of the container resource design device (master node 10) and the like according to the present invention will be described.

A container resource design device according to the present invention is a container resource design device (master node 10) for performing resource design for a virtualized container system, in which the container system is constituted by a plurality of worker nodes 20 configured to provide a service due to containers being placed thereon, and the container resource design device (master node 10) for performing generation and operation of the worker nodes 20, and the container resource design device (master node 10) includes: a container setting reception unit 11 configured to acquire definition information including a replica set count indicating a number of redundancies of a pod 2 in units of pods 2, a pod 2 being a set of one or more of the containers, an affinity rule indicating a condition for starting up the containers, and a failure tolerance count indicating a number of the worker nodes 20 for which occurrence of a failure is allowed in order to maintain a state in which self-healing is possible; a resource calculation unit 12 configured to extract the replica set count, the affinity rule, and the failure tolerance count from the definition information, calculate a required worker node count indicating a minimum required number of the worker nodes 20 while satisfying the replica set count and satisfying the condition defined by the affinity rule, even if a failure of the failure tolerance count or less has occurred in the worker nodes 20, and dispense the worker nodes 20 of the required worker node count as resources by transmitting resource dispensation instruction information, which is information instructing dispensation of resources, to a resource management mechanism, the resource dispensation instruction information including the calculated required worker node count; and a container setting unit 13 configured to determine the placement of the pods 2 of the number indicated by the replica set count on the dispensed worker nodes 20, and transmit container setting information instructing setting of containers constituting the pods 2 to the worker nodes 20 for which the placement of the pods 2 was determined.

By doing so, the container resource design device (master node 10) according to the present invention can maintain the declarative state while satisfying the conditions of the replica set count and the affinity rule. Also, the container resource design device (master node 10) can automatically perform redundancy design with consideration given to the failure tolerance count. Accordingly, the container resource design device (master node 10) can eliminate the need for manual resource design and improve service continuity in the event of a failure.

Also, the container resource design device (master node 10) is characterized in that the container setting reception unit 11 acquires a plurality of pieces of the definition information related to respectively different pods 2, and the resource calculation unit 12 calculates the required worker node count that is the minimum required overall while satisfying the replica set count and satisfying the condition defined by the affinity rule even if a failure of the failure tolerance count or less has occurred in the worker nodes 20, each pod 2 being indicated by the respective plurality of pieces of definition information.

By doing so, even when multiple containers are set (deployed) based on the definition information of different pods at the same time, the minimum number of worker nodes required overall can be calculated. Accordingly, resources can be operated more efficiently.

Also, the container resource design device (master node 10) is characterized in that if a label indicating a type of a resource for starting up the containers is attached to the affinity rule, the resource calculation unit 12 distinguishes the type of the resource indicated by the label, calculates the required label node count indicating the minimum required number of the worker nodes 20 in the resource of the distinguished type, and transmits the required label node count to the resource management mechanism in a state of being included in the resource dispensation instruction information.

By doing so, the minimum number of worker nodes required can be calculated with consideration given to the type of the resource. Accordingly, resources can be operated more efficiently.

It should be noted that the present invention is not limited to the embodiments described above, and many modifications can be made by a person having ordinary knowledge in the art within the technical idea of the present invention.

For example, the VNFM 300 may be provided with all or some of the functions (container setting reception unit 11, resource calculation unit 12, container setting unit 13) that are a characteristic configuration of the container resource design device (master node 10) according to the present embodiment. Even in this case, the master node 10 and the VNFM 300 can cooperate with each other to realize the processing of the present embodiment.

REFERENCE SIGNS LIST

2 Pod
10 Container resource design device (master node)
11 Container setting reception unit
12 Resource calculation unit
13 Container setting unit
20 Worker node
300 VNFM (resource management mechanism)
400 VIM (resource management mechanism)
1000 Container resource design system

The invention claimed is:

1. A container resource design device for performing resource design for a virtualized container system,
   wherein the container system comprises a plurality of worker nodes configured to provide a service due to containers being placed thereon, and the container resource design device for performing generation and operation of the worker nodes, and
   the container resource design device comprises a processor configured to perform operations comprising:
      acquiring definition information including a replica set count indicating a number of redundancies of a pod in units of pods, a pod being a set of one or more of the containers, an affinity rule indicating a condition for starting up the containers, and a failure tolerance count indicating a number of the worker nodes for which occurrence of a failure is allowed in order to maintain a state in which self-healing is possible;
      extracting the replica set count, the affinity rule, and the failure tolerance count from the definition information;

calculating a required worker node count indicating a minimum required number of the worker nodes while satisfying the replica set count and satisfying the condition defined by the affinity rule, even if a failure of the failure tolerance count or less has occurred in the worker nodes;

dispensing the worker nodes of the required worker node count as resources by transmitting resource dispensation instruction information, which is information instructing dispensation of resources, to a resource management mechanism, the resource dispensation instruction information including the calculated required worker node count;

determining placement of the pods of the number indicated by the replica set count on the dispensed worker nodes; and transmitting container setting information instructing setting of containers constituting the pods to the worker nodes for which the placement of the pods was determined, wherein in response to determining a label indicating a type of a resource for starting up the containers is attached to the affinity rule, the processor distinguishes the type of the resource indicated by the label, calculates a required label node count indicating the minimum required number of the worker nodes in the resource of the distinguished type, and transmits the required label node count to the resource management mechanism in a state of being included in the resource dispensation instruction information.

2. The container resource design device according to claim 1, wherein acquiring the definition information comprises acquiring a plurality of pieces of the definition information related to respectively different pods, and calculating the required worker node count comprises calculating the required worker node count that is the minimum required overall while satisfying the replica set count and satisfying the condition defined by the affinity rule even if a failure of the failure tolerance count or less has occurred in the worker nodes, each pod being indicated by the respective plurality of pieces of definition information.

3. A container resource design method for a container resource design device for performing resource design for a virtualized container system, wherein the container system comprises a plurality of worker nodes configured to provide a service due to containers being placed thereon, and the container resource design device for performing generation and operation of the worker nodes, and the container resource design method comprises:

acquiring definition information including a replica set count indicating a number of redundancies of a pod in units of pods, a pod being a set of one or more of the containers, an affinity rule indicating a condition for starting up the container, and a failure tolerance count indicating a number of the worker nodes for which occurrence of a failure is allowed in order to maintain a state in which self-healing is possible;

extracting the replica set count, the affinity rule, and the failure tolerance count from the definition information, and calculating a required worker node count indicating a minimum required number of the worker nodes while satisfying the replica set count and satisfying the condition defined in the affinity rule, even if a failure of the failure tolerance count or less has occurred in the worker nodes;

dispensing the worker nodes of the required worker node count as resources by transmitting resource dispensation instruction information, which is information instructing dispensation of resources, to a resource management mechanism, the resource dispensation instruction information including the calculated required worker node count; and determining placement of the pods of the number indicated by the replica set count on the dispensed worker nodes, and transmitting container setting information instructing setting of containers constituting the pods to the worker nodes for which the placement of the pods was determined, wherein in response to determining a label indicating a type of a resource for starting up the containers is attached to the affinity rule, a processor distinguishes the type of the resource indicated by the label, calculates a required label node count indicating the minimum required number of the worker nodes in the resource of the distinguished type, and transmits the required label node count to the resource management mechanism in a state of being included in the resource dispensation instruction information.

4. A non-transitory computer-readable medium storing program instructions that cause a computer to perform operations comprising:

acquiring definition information including a replica set count indicating a number of redundancies of a pod in units of pods, a pod being a set of one or more of containers, an affinity rule indicating a condition for starting up the containers, and a failure tolerance count indicating a number of worker nodes for which occurrence of a failure is allowed in order to maintain a state in which self-healing is possible;

extracting the replica set count, the affinity rule, and the failure tolerance count from the definition information;

calculating a required worker node count indicating a minimum required number of the worker nodes while satisfying the replica set count and satisfying the condition defined by the affinity rule, even if a failure of the failure tolerance count or less has occurred in the worker nodes;

dispensing the worker nodes of the required worker node count as resources by transmitting resource dispensation instruction information, which is information instructing dispensation of resources, to a resource management mechanism, the resource dispensation instruction information including the calculated required worker node count;

determining placement of the pods of the number indicated by the replica set count on the dispensed worker nodes; and transmitting container setting information instructing setting of containers constituting the pods to the worker nodes for which the placement of the pods was determined, wherein in response to determining a label indicating a type of a resource for starting up the containers is attached to the affinity rule, a processor distinguishes the type of the resource indicated by the label, calculates a required label node count indicating the minimum required number of the worker nodes in the resource of the distinguished type, and transmits the required label node count to the resource management mechanism in a state of being included in the resource dispensation instruction information.

\* \* \* \* \*